United States Patent [19]
Nonaka

[11] Patent Number: 5,604,563
[45] Date of Patent: Feb. 18, 1997

[54] CAMERA HAVING MULTI-POINT DISTANCE MEASURING DEVICE FOR AUTO-FOCUSING

[75] Inventor: Osamu Nonaka, Sagamihara, Japan

[73] Assignee: Olympus Optical Co., Ltd., Tokyo, Japan

[21] Appl. No.: 318,354

[22] Filed: Oct. 5, 1994

[30] Foreign Application Priority Data

Oct. 12, 1993 [JP] Japan .................................. 5-254301

[51] Int. Cl.$^6$ ......................... G03B 3/00; G03B 13/14; G01C 3/00
[52] U.S. Cl. ......................... 396/149; 356/3.01
[58] Field of Search ................. 354/403, 195.1, 354/195.12, 199, 149.11, 219, 222, 164, 163; 356/3.01

[56] References Cited

U.S. PATENT DOCUMENTS

| | | | |
|---|---|---|---|
| 5,373,343 | 12/1994 | Nonaka | 354/403 |
| 5,424,796 | 6/1995 | Kondoh | 354/403 |
| 5,440,367 | 8/1995 | Suda | 354/402 |

FOREIGN PATENT DOCUMENTS 1-147439  6/1989  Japan .
5-5833  1/1993  Japan .

Primary Examiner—Safet Metjahic
Assistant Examiner—Eric Nelson
Attorney, Agent, or Firm—Frishauf, Holtz, Goodman, Langer & Chick

[57] ABSTRACT

A switch input unit detects the ON/OFF states of first and second release switches. A timer unit detects the input timings of the switches. A CPU controls a finder shift mechanism via a shift control unit in accordance with the timing detection results so as to switch the optical axis of a finder device. A multi-point distance measuring circuit for multi AF measures object distances at a plurality of points in a frame in accordance with an instruction from a point switching unit. The CPU re-controls the finder shift mechanism and the multi-point distance measuring circuit depending on the input states of the first and second release switches. More specifically, in a camera having a multi-point distance measuring device according to this invention, in order to take a picture free from a parallax by a simple operation, after an operation for switching the optical axis of the finder device is performed, distance measurement is performed again immediately before a photographing operation.

23 Claims, 9 Drawing Sheets

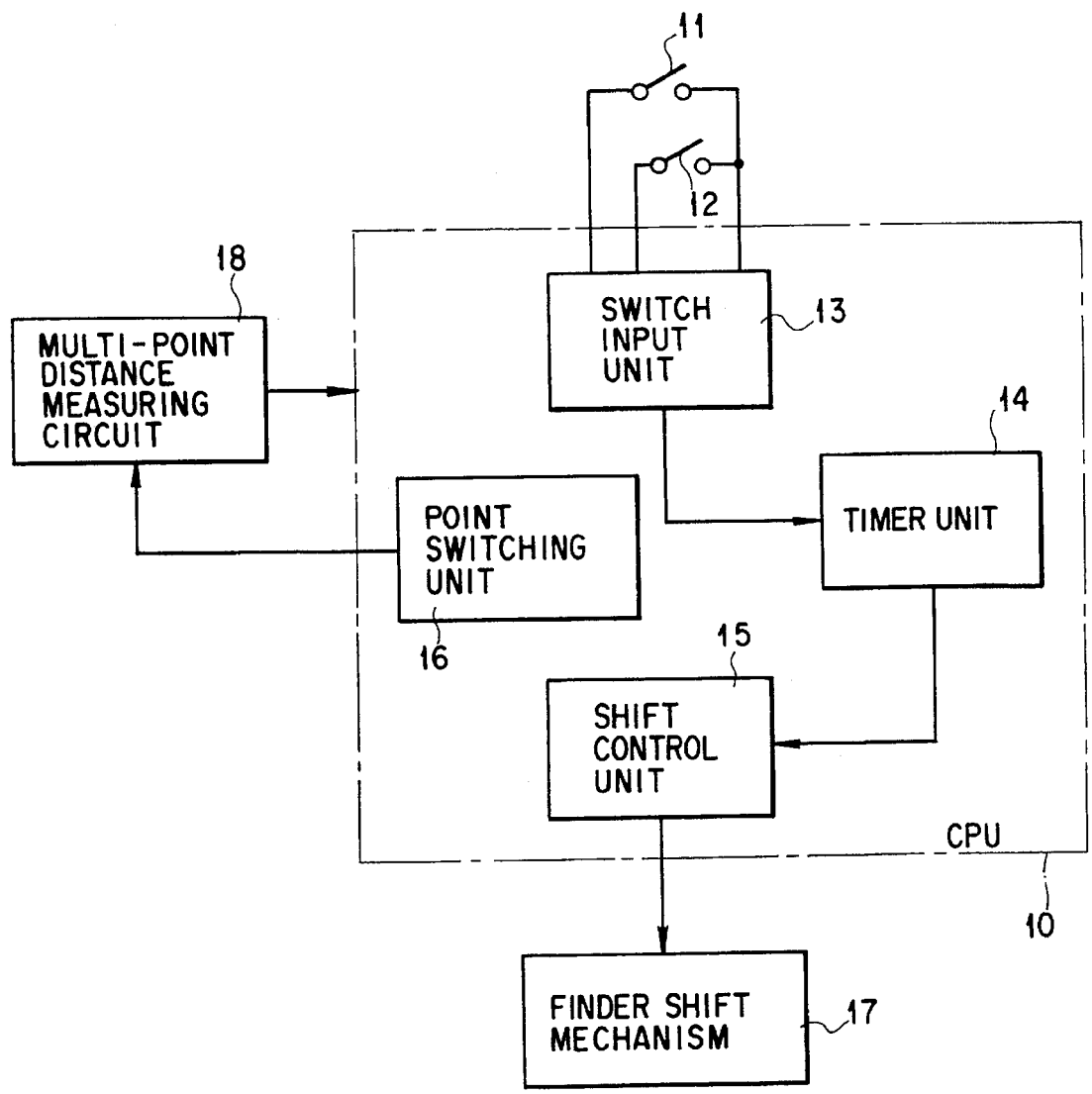
F I G. 1

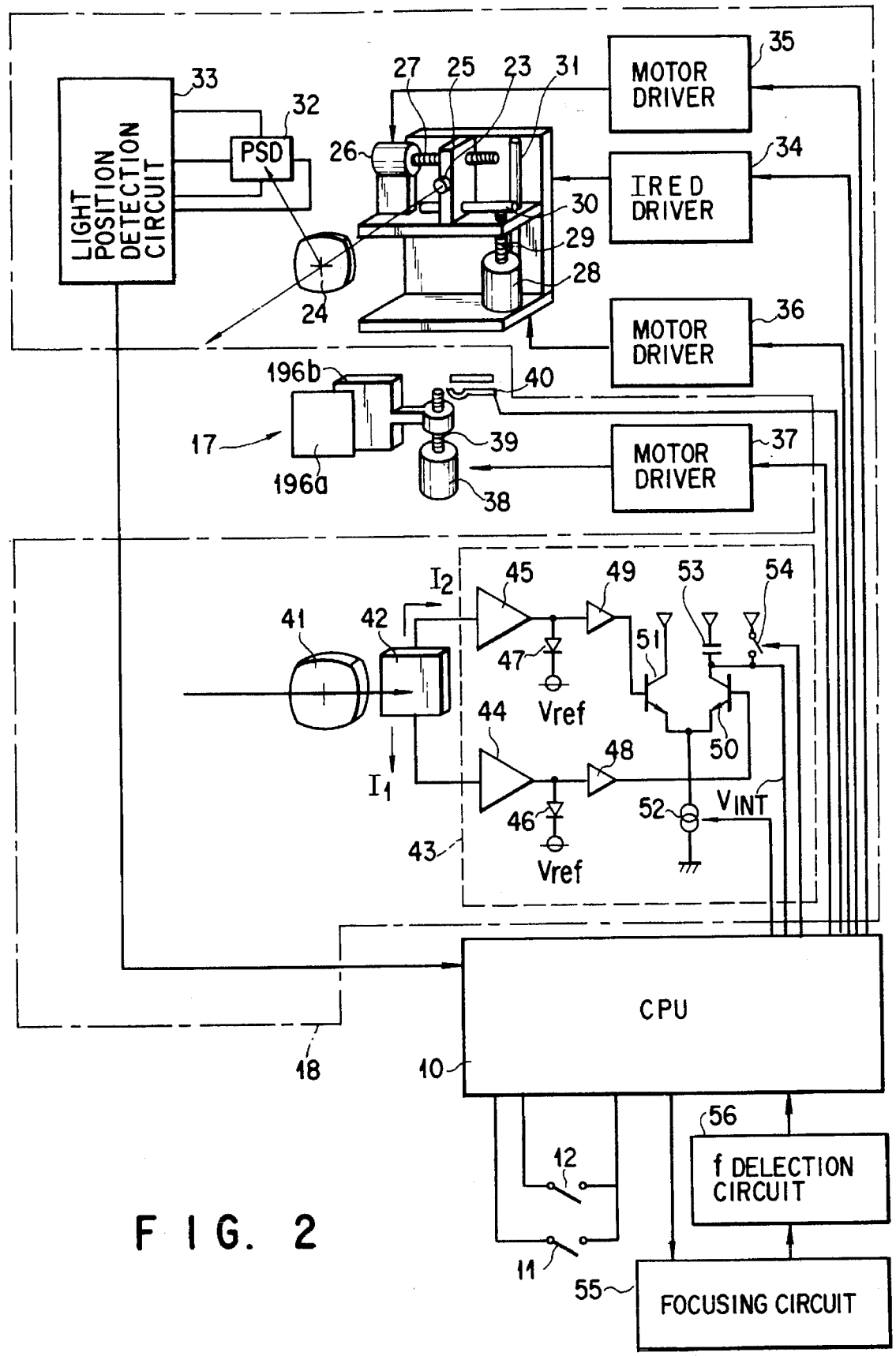
F I G. 2

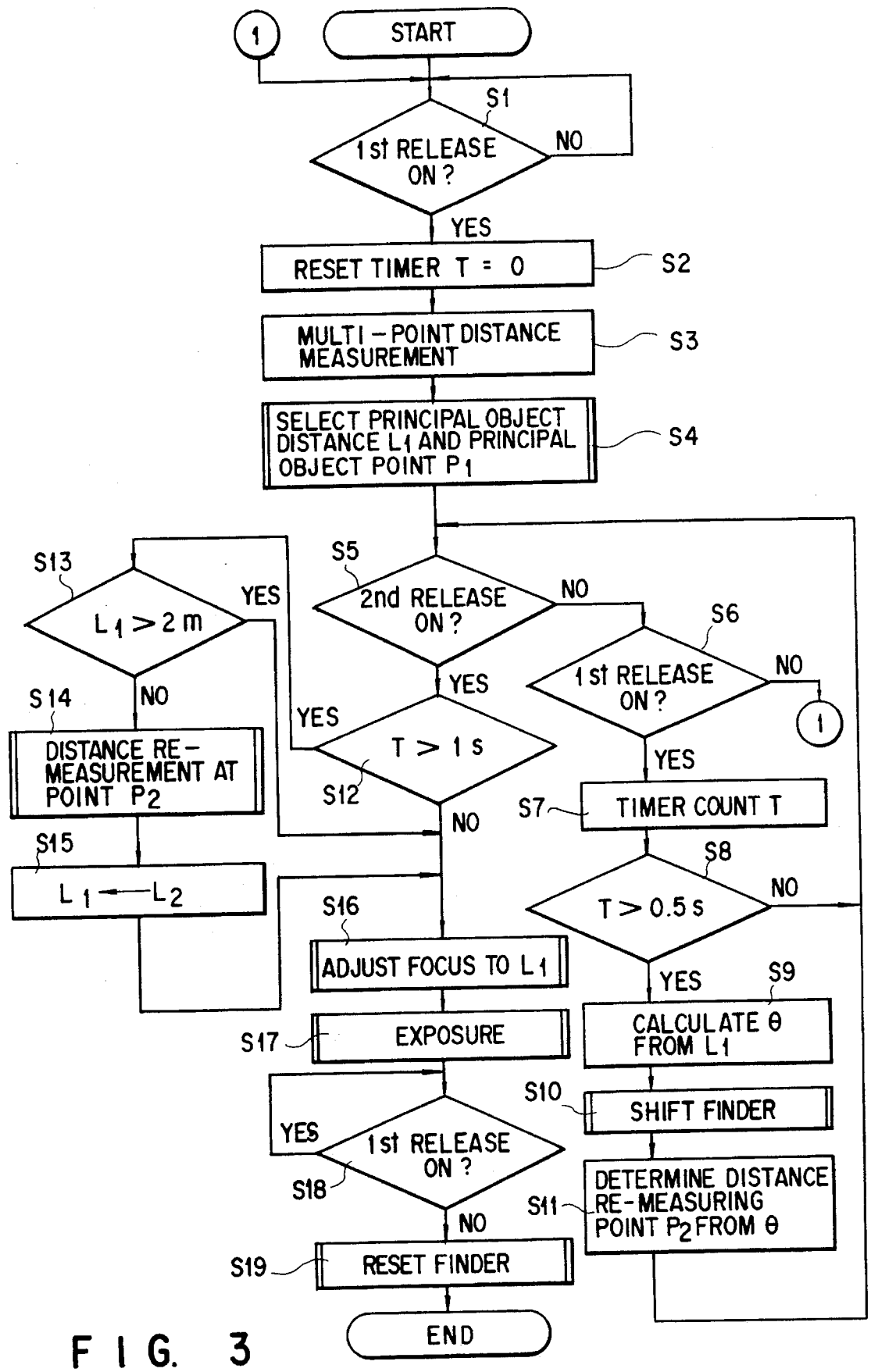
F I G. 3

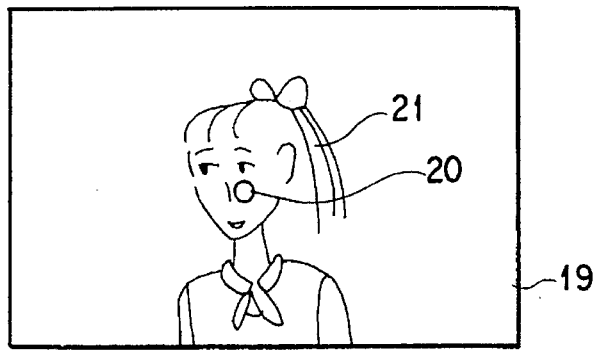
F I G. 7A
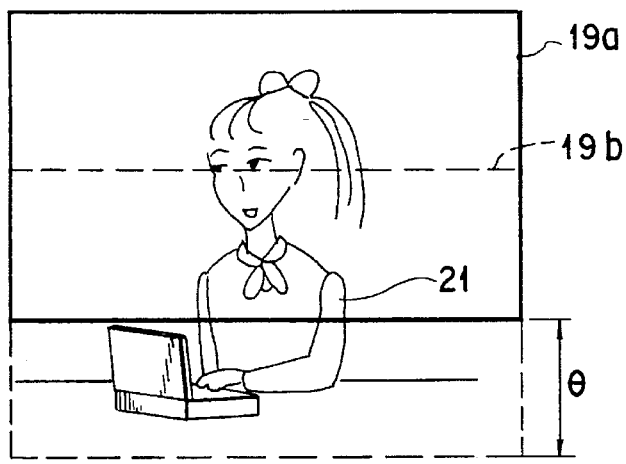
F I G. 7B
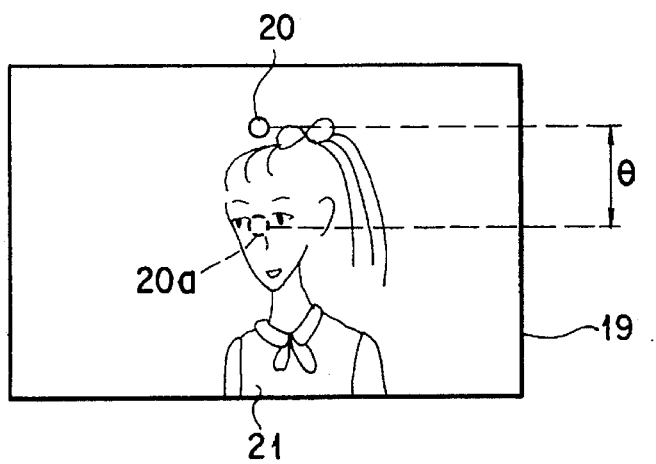
F I G. 7C
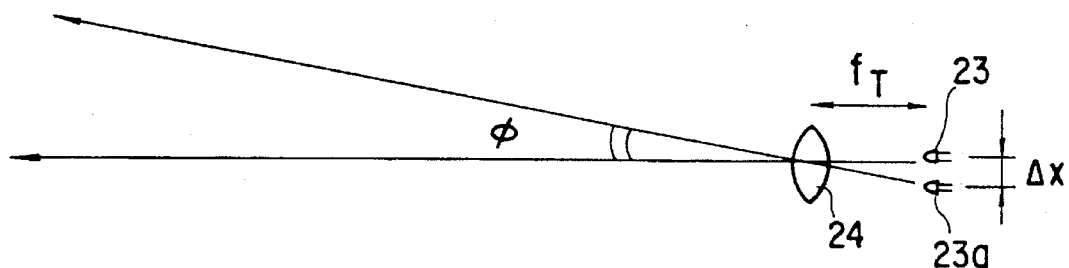
F I G. 8

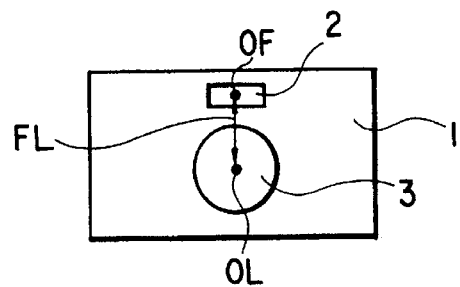
F I G. 11 (PRIOR ART)
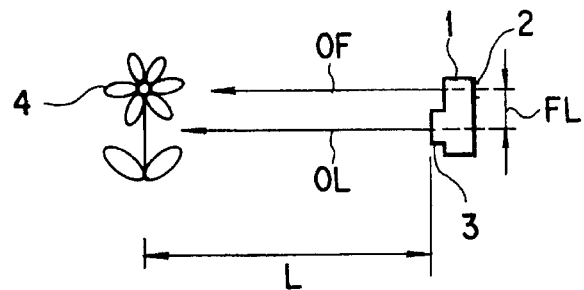
F I G. 12A (PRIOR ART)
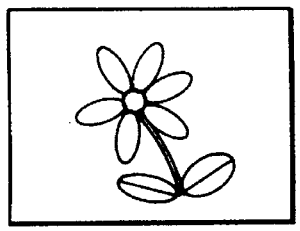 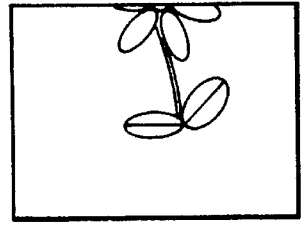
F I G. 12B
(PRIOR ART)
F I G. 12C
(PRIOR ART)
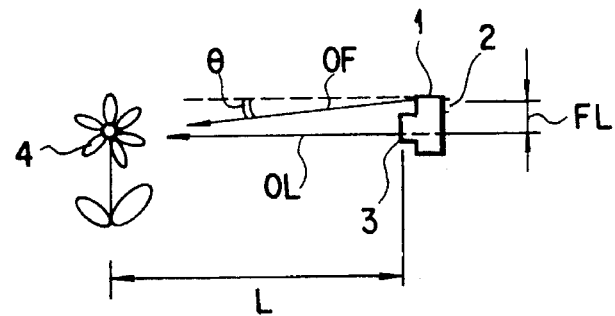
F I G. 13
(PRIOR ART)

CAMERA HAVING MULTI-POINT DISTANCE MEASURING DEVICE FOR AUTO-FOCUSING

BACKGROUND OF THE INVENTION

1. Field of the Invention

The present invention generally relates to a camera and, more particularly, to a camera having a multi-point distance measuring device for automatically correcting the parallax of a so-called lens shutter camera which has an optical system different from a photographing optical system.

2. Description of the Related Art

As is well known, a lens shutter camera, which has been conventionally used, has a finder device including a finder optical system different from an optical system of a photographing lens.

FIG. 11 shows an example of the conventional lens shutter camera. Referring to FIG. 11, a finder device 2 and a photographing lens 3 are arranged on a camera main body 1, so that their optical axes are separated from each other. For this reason, an object image (finder image) observed in a photographing frame via the finder device 2 and an actually photographed object image are undesirably shifted from each other due to a parallax, as shown in FIGS. 12A, 12B, and 12C.

For example, when a flower 4 as an object is to be photographed in a state shown in FIG. 12A, and when an optical axis OF of the finder device 2 and an optical axis OL of the photographing lens 3 are parallel to each other, and the finder device 2 and the photographing lens 3 are arranged at positions separated by a distance FL, even if an image of the flower 4 is observed in the finder device 2, as shown in FIG. 12B, the actually taken picture becomes an offset object image, as shown in FIG. 12C. Therefore, a photographer cannot often take a desired picture using the conventional lens shutter camera.

In order to solve this problem, the following technique is known. That is, as shown in FIG. 13, an inclination angle θ is determined based on an object distance L and the distance FL between the finder device 2 and the photographing lens 3, and the optical axis of the finder device is inclined through the angle θ, so that a point observed by the finder device 2 coincides with a point observed by the photographing lens 3. As an example of this technique, Jpn. Pat. Appln. KOKAI Application No. 1-147439 discloses, a parallax correction device for a camera, which sets the inclination angle θ by utilizing a Drehkeil type prism.

In the case of a camera in which an auto-focus (AF) distance measuring device measures the distance to an object on an optical axis different from those of the finder device and the photographing lens, a parallax is also generated between the finder device and the AF distance measuring device, and a point observed via the finder device and the actual distance-measuring point become different from each other in the same principle as that shown in FIG. 12A.

In order to solve this problem, in the parallax correction device for a camera of Jpn. Pat. Appln. KOKAI Application No. 1-147439 described above, an arrangement for measuring the distance to an object on the optical axis of the finder device 2 is disclosed.

Furthermore, Jpn. Pat. Appln. KOKAI Application No. 5-5833 discloses a technique for performing a macro photographing operation on the basis of distance measuring information of a surrounding region while ignoring distance measuring information of its central region by utilizing a multi-point AF mechanism.

However, when a distance measuring device is assembled in the finder device, the structure of the finder device becomes complicated, and the optical path must be split into those for the finder connection and distance measuring systems. For this reason, such an arrangement tends to impair observability of the finder device and the S/N ratio of a distance measuring system.

When the optical axis of the finder device is switched on a distance measuring operation, a photographer must re-determine the composition of a picture. During this time, the distance to an object may be changed.

Furthermore, in the parallax correction device for a camera of Jpn. Pat. Appln. KOKAI Application No. 1-147439 described above, a distance re-measuring button is provided to a release button to allow re-measurement of the distance. However, when the optical axis of the finder device is switched for each distance measuring operation, a photographer must perform very troublesome operations.

Note that Jpn. Pat. Appln. KOKAI Application No. 5-5833 does not mention about any parallax generated between the finder device and the photographing lens.

SUMMARY OF THE INVENTION

It is, therefore, an object of the present invention to provide a new and improved camera having a multi-point distance measuring device for auto-focusing in which parallax correction can be performed without complicating the arrangement and with improved operability.

According to one aspect of the present invention, there is provided a camera having a photographing lens and a finder for observing an object image using an optical system different from the photographing lens, comprising: multi-point distance measuring means capable of measuring distances to objects corresponding to a plurality of positions on a photographing frame; determination means for determining a distance to a principal object on the basis of a plurality of distance measurement results from the multi-point distance measuring means; a shift mechanism for shifting an observation frame of the finder; shift control means for driving the shift mechanism so as to eliminate a parallax of the finder in accordance with the distance to the principal object determined by the determination means; and distance re-measuring means which can perform distance re-measurement by changing the distance measuring position of the principal object by an amount shifted by the shift mechanism.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a schematic block diagram showing the arrangement of a main part of the first embodiment of a camera having a multi-point distance measuring device according to the present invention;

FIG. 2 is a detailed block diagram showing the arrangement of the camera having the multi-point distance measuring device shown in FIG. 1;

FIG. 3 is a flow chart for explaining the operation of the first embodiment;

FIGS. 7A, 7B, and 7C are views showing a frame range obtained upon switching of the optical axis of a finder device;

FIG. 8 is a view for explaining a technique for projecting distance measuring light obliquely by $\phi$;

FIG. 11 is a front view showing an example of a conventional lens shutter camera;

FIGS. 12A, 12B, and 12C are views for explaining a parallax caused by the camera shown in FIG. 11; and FIG. 13 is a schematic view for explaining a parallax correction device for the conventional lens shutter camera.

DETAILED DESCRIPTION OF THE PREFERRED EMBODIMENTS

Figure 4:
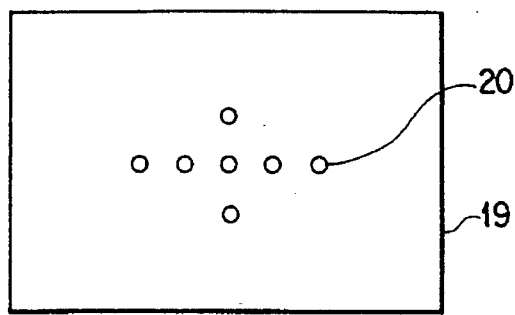
FIG. 4 is a view showing a plurality of distance measuring points in a finder so as to explain a multi-point distance measuring operation for multi AF.

Reference will now be made in detail to the presently preferred embodiments of the invention as illustrated in the accompanying drawings, in which like reference characters designate like or corresponding parts throughout the several drawings.

The preferred embodiments of the present invention will be described hereinafter with reference to the accompanying drawings.

FIG. 1 is a schematic block diagram showing the arrangement of a main part of the first embodiment of a camera having a multi-point distance measuring device for multi AF according to the present invention. Referring to FIG. 1, an arithmetic control circuit (central processing unit; CPU) 10 comprises, e.g., a one-chip microcomputer, and the like. The CPU 10 has a switch input unit 13 to which two release switches 11 and 12 are connected which are opened/closed in response to a release operation of the camera, and which comprises an interface circuit, and the like. The release switch 11 is closed at the half-stroke position of a release button (not shown), and the release switch 12 is closed at the full-stroke position of the release button. These release switches 11 and 12 will be respectively referred to as a first (1st) release switch and a second (2nd) release switch.

The CPU 10 incorporates a timer unit 14 for measuring the input timings of the switches supplied from the switch input unit 13, a shift control unit 15 for controlling a finder shift mechanism 17 in accordance with a signal from the timer unit 14, and a point switching unit 16 in addition to the above-mentioned switch input unit 13.

The finder shift mechanism 17 is used for switching the optical axis of a finder device (to be described later), and is controlled by the above-mentioned shift control unit 15. A multi-point distance measuring circuit 18 for multi AF is a circuit capable of performing distance measurement at a plurality of points in a picture frame viewed from the finder device so as to attain multi AF, and the switching operation of the distance measuring points is controlled by the point switching unit 16 in the CPU 10.

With this arrangement, when the ON/OFF operations of the first and second release switches 11 and 12 are detected by the switch input unit 13, the input timings of these switches are detected by the timer unit 14. The CPU 10 controls the operation of the finder shift mechanism 17 via the shift control unit 15 in accordance with the timing detection results, thereby switching the optical axis of the finder device. The multi-point distance measuring circuit 18 for multi AF measures object distances at a plurality of points in the picture frame in accordance with an instruction from the point switching unit 16.

The CPU 10 executes control of the finder shift mechanism 17 and re-control of the multi-point distance measuring circuit 18 for multi AF in correspondence with the output from the multi-point distance measuring circuit 18 and the input states of the first and second release switches 11 and 12.

FIG. 2 shows the detailed arrangement of a main part of the camera having the distance measuring device shown in FIG. 1.

An infrared light-emitting diode (IRED) 23 projects distance measuring light onto an object via a projection lens 24, and is attached to a movable member 25. The movable member 25 can two-dimensionally scan the IRED 23 upon its horizontal and vertical movements along rails 30 and 31 by moving forces from a motor 26, a feed screw 27, a motor 28, and a feed screw 29. The scan position can be detected based on the incident position of some light components of the distance measuring light on a two-dimensional optical position sensitive device (PSD) 32 by a very small reflection optical system provided to the projection lens 24. A light position detection circuit 33 can comprise an analog circuit for detecting the light position on the basis of the output signal from the PSD 32.

The CPU 10 drives the IRED 23, the motors 26 and 28, and a motor 38 via an IRED driver 34 and motor drivers 35, 36, and 37, respectively. The CPU 10 changes the scan position of the IRED 23 by rotating the motors 26 and 28 via the motor drivers 35 and 36 while monitoring the light position detection result from the light position detection circuit 33.

Each time the scan position of the IRED 23 changes, the CPU 10 causes the IRED 23 to emit light via the IRED driver 34, thus projecting distance measuring light at different points in the picture frame.

The finder shift mechanism 17 for moving the optical axis of the finder device has basically the same arrangement as the scan mechanism of the IRED 23. The CPU 10 rotates the motor 38 via the motor driver 37. Then, a shift lens 196$b$ paired with a shift lens 196$a$ is shifted by a feed screw 39. The normal position of the shift lens 196$b$ is detected by an initial position switch 40 connected to the CPU 10, and the shift operation by a predetermined amount is controlled based on the number of revolutions of the motor from the OFF state of the switch 40.

The distance measuring light projected from the IRED 23 and reflected by an object is received via a light-receiving lens 41 arranged at a position separated by a base length from the projection lens 24, and is incident on an optical position sensitive device (PSD) 42. The PSD 42 can comprise a one-dimensional element capable of detection in only the base length direction unlike the PSD 32.

As described above, since the arrangement of a known light projection type triangulation device is employed, the object distance can be detected by calculating the ratio between two outputs $I_1$ and $I_2$ from the PSD 42 by a light position detection circuit 43.

In the light position detection circuit 43, preamplifiers 44 and 45 serve to fetch and amplify two current signals $I_1$ and $I_2$ output from the PSD 42 and to supply the amplified signals to compression diodes 46 and 47, respectively. Buffer circuits 48 and 49 input voltages obtained by compressing the signals $I_1$ and $I_2$ with reference to a reference voltage $V_{ref}$ to the bases of a pair of NPN transistors 50 and 51.

The emitters of the transistors 50 and 51 are commonly connected to each other, and are connected to a constant current source 52, as shown in FIG. 2. If the constant current from the constant current source 52 is represented by $I_0$, a collector current $I_{INT}$ supplied to the transistor 50 is given by:

$$I_{INT} = \{I_1/(I_1+I_2)\}I_0 \qquad (1)$$

As can be seen from equation (1), the collector current $I_{INT}$ is proportional to the ratio between one output $I_1$ from the PSD 42 and a sum $(I_1+I_2)$ of the two outputs.

Therefore, when an output voltage $V_{INT}$ of an integral capacitor 53 connected to the collector of the transistor 50 is initialized by switching a switch 54 from an ON state to an OFF state before light emission of the IRED 23, and the constant current source 52 is turned on for a predetermined period of time in synchronism with the light emission of the IRED 23, a voltage $V_{INT}$ proportional to equation (1) above is output to the integral capacitor 53.

The CPU 10 processes this voltage $V_{INT}$ after it converts the voltage $V_{INT}$ into a digital value using an A/D converter.

Based on the principle of the triangulation and the relationship between the outputs $I_1$ and $I_2$ from the PSD 42, the voltage $V_{INT}$ and a distance L have a relationship given by:

$$\begin{aligned} V_{INT} &= A_1[\{I_1/(I_1+I_2)\}I_0] \qquad (2) \\ &= A_2(1/L) \end{aligned}$$

$A_1$ and $A_2$: constants of proportionality The CPU 10 calculates the distance L based on the voltage $V_{INT}$ obtained at each scan point on the basis of the above-mentioned relationship.

Note that the light position detection circuit 33 for detecting the scan position of the IRED 23 on the basis of the output from the PSD 32 basically has the above-mentioned circuit arrangement.

The CPU 10 is connected to the first and second release switches 11 and 12 which are respectively turned on at the half- and full-stroke positions of the release button. Furthermore, a focusing circuit 55 is controlled by the CPU 10, and performs a focusing operation of the photographing lens in accordance with the distance measurement result. When the photographing lens comprises a zoom lens, the zoom position in a photographing operation is detected by a focal point (f) detection circuit 56, and is input to the CPU 10.

The operation according to the first embodiment of the present invention will be explained below with reference to the flow chart in FIG. 3 and FIGS. 4 to 8.

It is checked in step S1 if the first release switch 11 is turned on, so as to detect the half-stroke state of the camera release button. If YES in step S1, the flow advances to step S2 to reset the timer unit 14 incorporated in the CPU 10. In step S3, object distances at a plurality of points in the picture frame observed via the finder device are measured using the multi-point distance measuring circuit 18 for multi AF.

The multi-point distance measurement is a technique for performing distance measurement at a plurality of distance measuring points 20 in a finder 19 to acquire multi AF information, as shown in FIG. 4. For example, a technique for performing distance measurement while scanning a mirror or the entire distance measuring unit or a technique for performing distance measurement while sequentially switching distance measuring elements is known.

In step S4, a principal object distance $L_1$ and a distance measuring point at which the distance is obtained are selected on the basis of the distance measurement result in step S3. As the selection method, a so-called nearest distance selection method for selecting data indicating the nearest distance or a so-called center priority method for preferentially selecting an object at the center in the frame may be used. Also, as shown in FIG. 5A, in the case of multi-point distance measurement for multi AF, which acquires distance measurement data at continuous positions, data which may be considered to correspond to a person may be detected from a graph showing the relationship between the distance measuring point P and the distance L, as shown in FIG. 5B.

Figure 5A:
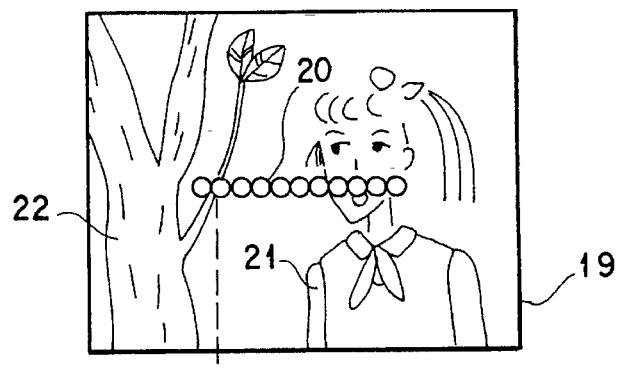
FIGS. 5A, 5B, and 5C are views for explaining a principal object distance $L_1$ and selection of a distance measuring point at which the distance is obtained.

For example, in the case of a composition shown in FIG. 5A, when a tree 22 as a miscellaneous object is closer than a person 21 as a principal object, a branch of the tree 22 is in focus, and the person 21 is out of focus, i.e., a so-called out-of-focus picture is obtained by a simple nearest distance selection method.

Figure 5B:
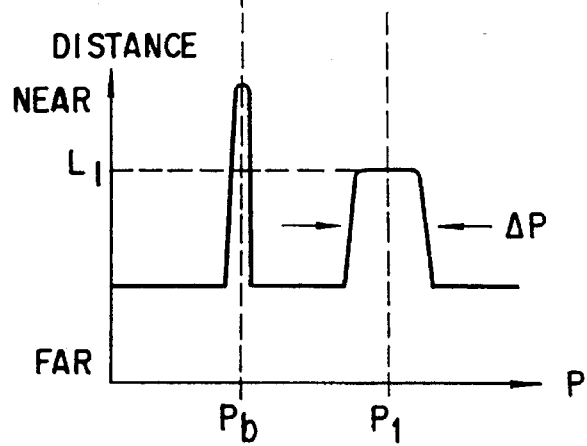

However, when a graph is formed based on data, as shown in FIG. 5B, it can be detected that the distance measurement data of the branch of the tree at a point $P_0$ is not a result obtained by measuring the distance to a person upon comparison with the shoulder length of a person as a general object. On the other hand, it can be detected that data at a point $P_1$ is data suitable for focusing because of an output width $\Delta P$ of identical distance data. In this manner, in step S4, the principal object distance $L_1$ and its position $P_1$ are obtained.

In step S5, it is checked based on the state of the second release switch 12 if the release button is depressed to the full-stroke position, i.e., if the photographing timing of a photographer is detected. At this time, if the second release switch 12 is OFF, the flow branches to step S6 to detect the state of the first release switch 11 again.

If it is determined in step S6 that the first release switch 11 is OFF, the CPU 10 determines that the photographer interrupts a photographing operation, and the flow returns to step S1. On the other hand, if it is determined in step S6 that the first release switch 11 is ON, the flow advances to step S7, and the timer unit 14 in the CPU 10 starts a count operation. Thereafter, it is checked in step S8 if a timer count result T is smaller than 0.5 sec.

If the CPU 10 determines that the timer count result T is smaller than 0.5 sec, the flow returns to step S5. On the other hand, when the photographer carefully determines a composition in step S7, since the count value of the timer unit 14 is counted up beyond 0.5 sec, an inclination angle θ with respect to the optical axis of the finder device is calculated using the following equation on the basis of the selected $L_1$ and the distance FL between the finder device and the photographing lens shown in FIGS. 11 to 12C in step S9 via step S8:

$$\theta = \arctan(FL/L_1) \qquad (3)$$

Thereafter, in step S10, control for inclining the finder optical axis is executed. The finder optical axis control is performed based on a finder device having the arrangement shown in FIG. 6A.

Figure 6A:
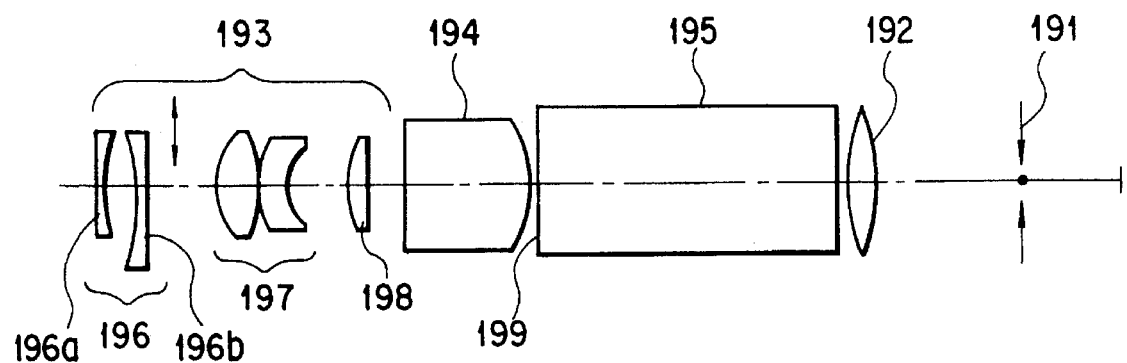
FIG. 6A is a view showing the arrangement of a finder.

Referring to FIG. 6A, reference numeral 191 denotes an eye point of the finder; and 192, a loupe. First and second prisms 194 and 195 are arranged between an objective lens system 193 and the loupe 192. An intermediate imaging plane 199 is formed at the first prism side of the second prism 195.

The objective lens system 193 is constituted by three lens groups 196, 197, and 198. The positions of these three lens groups 196, 197, and 198 are controlled in correspondence with the zooming operation of the photographing lens. Of these groups, the first lens group is constituted by the shift lenses 196a and 196b, and by shifting the shift lens 196b in the directions of a double-head arrow in FIG. 6A, the optical axis of the finder device can be controlled to the inclination angle θ given by equation (3).

Figure 6B:
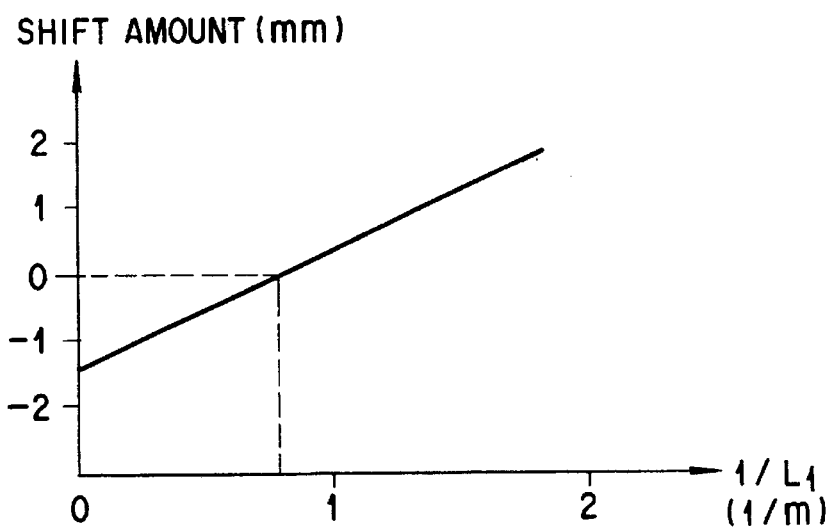
FIG. 6B is a graph showing the relationship between the reciprocal of the distance $L_1$ and the shift amount of a shift lens.

In this case, since the relationship between the reciprocal of the distance $L_1$ and the shift amount of the shift lenses 196a and 196b is as shown in FIG. 6B, the CPU 10 calculates the shift amount in accordance with the distance measurement result $L_1$ in step S10, and performs shift control of the shift lenses 196a and 196b via an actuator such as the motor 38 and the like.

When the finder frame is switched in this manner, the following problem to be described below with reference to FIGS. 7A, 7B, and 7C is posed.

FIG. 7A shows the frame in the finder 19 before the release button is depressed to the half-stroke position. However, upon switching of the finder at the angle θ, the photographer can observe a range 19b indicated by a broken line in FIG. 7B via the finder device, and can observe only a portion of a range 19a indicated by a solid line in FIG. 7B.

Since a range which can be actually photographed based on the distance measurement value at that time is the range 19b, the photographer sets the camera position again by the angle θ. At this time, the object distance may be changed. For this reason, the distance measurement is preferably performed again immediately before a photographing operation. However, since the photographer has set the camera position again, the distance measuring point 20 previously located at the central portion of the frame is shifted upward in the frame in proportion to the angle θ, as shown in FIG. 7C. A focusing operation cannot be normally performed based on the distance measurement result obtained at this point, and the distance at a lower position by the angle θ must be measured.

For this reason, in step S11, a distance measuring point $P_2$ used for measuring the distance again is determined on the basis of the angle θ and the principal object position $P_1$.

A method of projecting distance measuring light obliquely at φ will be described below with reference to FIG. 8.

In a conventional lens shutter camera, distance measuring light is projected toward an object, and the object distance is detected based on signal light reflected by the object. Therefore, the projection point of the distance measuring light corresponds to a distance measuring point.

In contrast to this, FIG. 8 shows a state wherein distance measuring light is projected from the IRED 23 via the projection lens 24.

In FIG. 8, $f_T$ represents the focal length of the projection lens 24. As shown in FIG. 8, when the IRED 23 is caused to emit light at a position 23a, a projection angle φ of the distance measuring light is set to establish the following relation based on a difference Δx between the IRED 23 and the position 23a and the focal length $f_T$:

$$\phi = \arctan(\Delta x/f_T) \qquad (4)$$

Therefore, the distance measuring point can be controlled by controlling Δx. More specifically, Δx is calculated, so that the result of equation (4) agrees with the inclination angle θ, and the IRED 23 is caused to emit light from the calculated position.

Figure 5C:
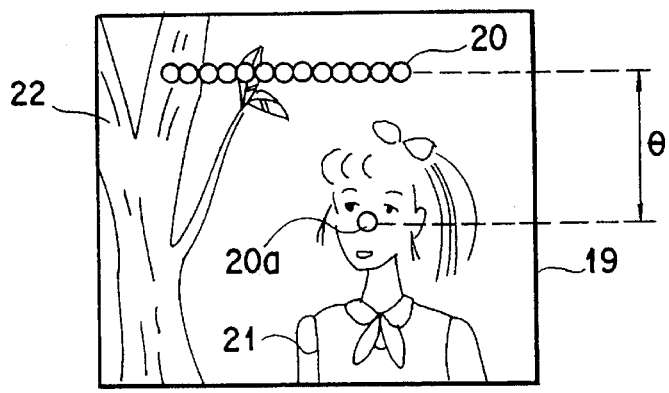

As a result, as shown in FIG. 5C, the coordinates, in the horizontal direction of the frame, of the position 20 subjected to the distance measurement at the ON timing of the first release switch and the distance measuring position 20a determined in step S11 do not change from $P_1$ shown in FIG. 5B, and in the vertical direction, the distance is measured at a point shifted by the angle θ to satisfy the relation given by equation (4).

The photographer performs a photographing operation while observing the finder switched as described above.

If it is determined in step S5 that the second release switch 12 is turned on, the flow advances to step S12, and the count result of the timer is compared with a predetermined value again. When the count result is longer than 1 sec, the CPU 10 determines that the photographer may have re-set the camera position, and the flow branches to step S13. On the other hand, if it is determined in step S12 that the timer count result T is shorter than 1 sec, the flow advances to step S16 to adjust the focus to the distance $L_1$. Subsequently, an exposure sequence is started.

In step S13, the distance measurement result $L_1$ obtained when the first release switch 11 is ON is compared with a predetermined distance of 2 m. When the distance measurement result $L_1$ is larger than the distance of 2 m, the CPU 10 determines that a change in distance upon re-setting of the camera position by the photographer is negligible, and the flow branches to step S16. On the other hand, when the distance measurement result $L_1$ is equal to or smaller than the distance of 2 m, the CPU 10 determines that a change in distance upon re-setting of the camera position by the photographer is not negligible, and the flow advances to step S14 to measure the distance at the position $P_2$ determined in step S11.

In step S15, a distance re-measurement result $L_2$ obtained in step S14 is determined to be a focusing distance. In step S16, the focus is adjusted to this distance.

In this manner, a focusing operation is performed in step S16, and an exposure operation is performed in step S17. It is then checked in step S18 if the first release switch 11 is depressed. When the first release switch 11 is turned off, the flow advances to step S19 to restore the optical axis of the finder device. In this manner, a troublesome operation due to switching of the optical axis of the finder device can be eliminated.

According to the first embodiment described above, a parallax can be effectively eliminated, and a photographer can take a picture, exactly as seen from the finder device.

In addition, according to the first embodiment described above, since the distance measurement is performed again immediately before a photographing operation after the operation for switching the optical axis of the finder device is performed, a focusing operation can be normally performed even when a photographer re-sets the camera position after the optical axis of the finder device is switched.

Furthermore, in the first embodiment, the distance measurement is performed at a plurality of points in the frame (multi AF) when the release button is depressed to the half-stroke position. However, in the distance re-measuring operation, the distance is measured at only one point determined based on the previous distance measurement result. Therefore, a camera which can reduce a time lag and can prevent a shutter chance from being lost can be provided.

Note that the distance re-measurement is not performed for a far-distance object for which a change in object distance becomes relatively small and is negligible even when the camera position is re-set. Therefore, the time lag can be further shortened, and an adverse effect caused by unnecessary distance measurement can be prevented.

In a shutter chance priority photographing operation, since the difference between the ON timings of the first and second release switches is very small, step S10 in the flow chart in FIG. 3 is not executed, and the optical axis of the finder device is not switched. For this reason, the photographer is not troubled by the switching operation of the optical axis of the finder device after the photographing operation.

The second embodiment of the present invention will be described below.

Figure 9A:
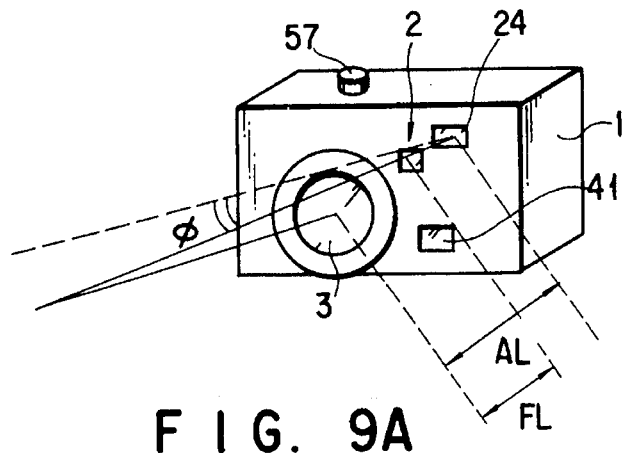
FIG. 9A is a perspective view showing the arrangement of a finder device, a photographing lens, a projection lens, and a light-receiving lens of a camera according to the second embodiment of the present invention.

In the second embodiment, the finder device 2, the photographing lens 3, the projection lens 24, and the light-receiving lens 41 of the camera are arranged, as shown in FIG. 9A. More specifically, the photographing lens 3, the finder device 2, and the projection lens 24 for AF are almost linearly arranged on the front surface of the camera main body 1. The light-receiving lens 41 is also arranged on the front surface of the camera main body 1, and a release button 57 is arranged on the upper portion of the camera main body 1.

When the finder device 2 and the lenses 3, 24, and 41 are arranged, as described above, distance measurement at the center of the finder and distance measurement at the center of a picture frame can be realized by scanning distance measuring light emitted from the IRED 23 along the line.

Figure 9B:
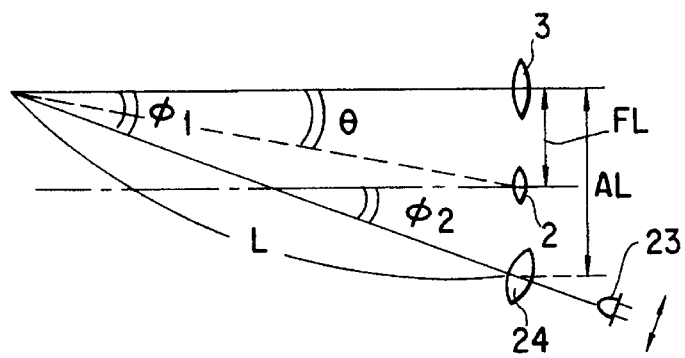
FIG. 9B is a view for explaining a multi-point distance measuring operation according to the second embodiment.
Figure 9C:
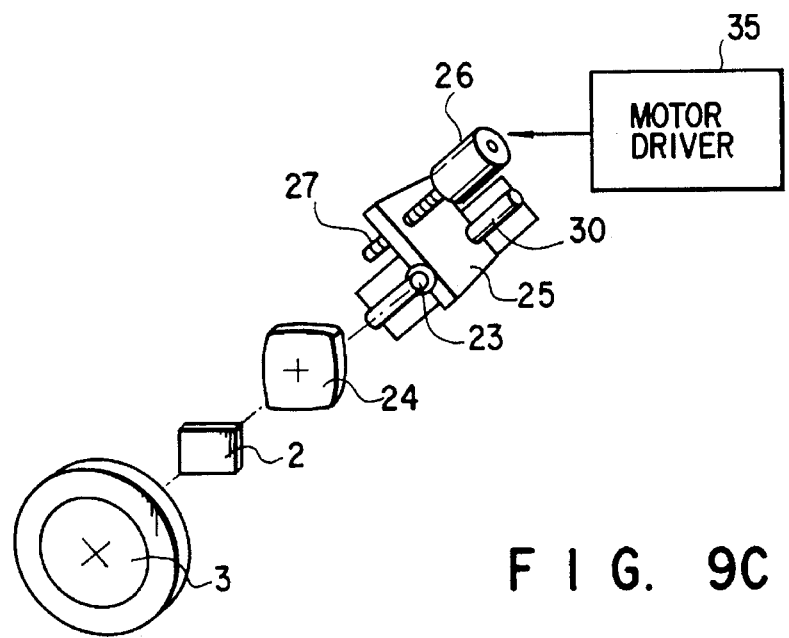
FIG. 9C is a perspective view showing the arrangement of a distance measuring light scan mechanism used in the second embodiment.

A scan mechanism of the distance measuring light has an arrangement, as shown in, e.g., FIG. 9C. The rail 30 is arranged in a direction connecting the photographing lens 3, the finder device 2, and the projection lens 24. When the movable member 25 is moved along this rail 30, the IRED 23 moves. The movable member 25 is moved by the motor 26 and the feed screw 27 via the motor driver 35, as described above.

When the IRED 23 is scanned by the above-mentioned arrangement, the distance measurement can be performed at both the center of the finder and the center of the picture frame under a condition shown in FIG. 9B.

Note that the second embodiment adopts substantially the same arrangement as that shown in FIG. 2.

More specifically, in FIG. 9B, if the distance between the finder device 2 and the photographing lens 3 is represented by FL and the distance between the photographing lens 3 and the projection lens 24 is represented by AL, when a projection angle $\phi$ and a distance measurement result L in FIG. 9B satisfy:

$$L\sin\phi_1 = AL \quad (5)$$

it can be determined that the distance measurement at the central portion of the picture frame is attained. On the other hand, when the following condition is satisfied:

$$L\sin\phi_2 = AL - FL \quad (6)$$

it can be determined that the distance measurement at the central portion of the finder frame is attained. As a result of the multi-point distance measurement, the CPU 10 can determine based on the projection angle $\phi$ and the distance measurement result L which data is the distance measurement result at the center of the frame.

The operation of the second embodiment will be described below with reference to the flow chart shown in FIG. 10. In this flow chart, some steps are the same as those in the flow chart in FIG. 3, and some other steps are modified to attain the frame center priority mode. For this reason, only different steps will be described in detail below.

when object distances are measured by the multi-point distance measurement for multi AF in steps S21 to S23, not a principal object distance but an object distance $L_1$ at the center of the finder is detected in step S24.

The distance $L_1$ is a distance which satisfies equation (6) together with the projection angle $\phi$ at that time. The CPU 10 can select the distance $L_1$ which satisfies equation (6) from combinations of the scan positions (projection angle $\phi$) of the IRED 23 and the distance measurement results obtained as a result of multi-point distance measurement for multi AF.

A time interval T from when the first release switch 11 is turned on until the second release switch 12 is turned on is detected in steps S26 and S27. If it is determined in step S28 that the time interval T is longer than 0.5 sec, the switching operation of the optical axis of the finder device is performed as a countermeasure against a parallax.

Figure 10:
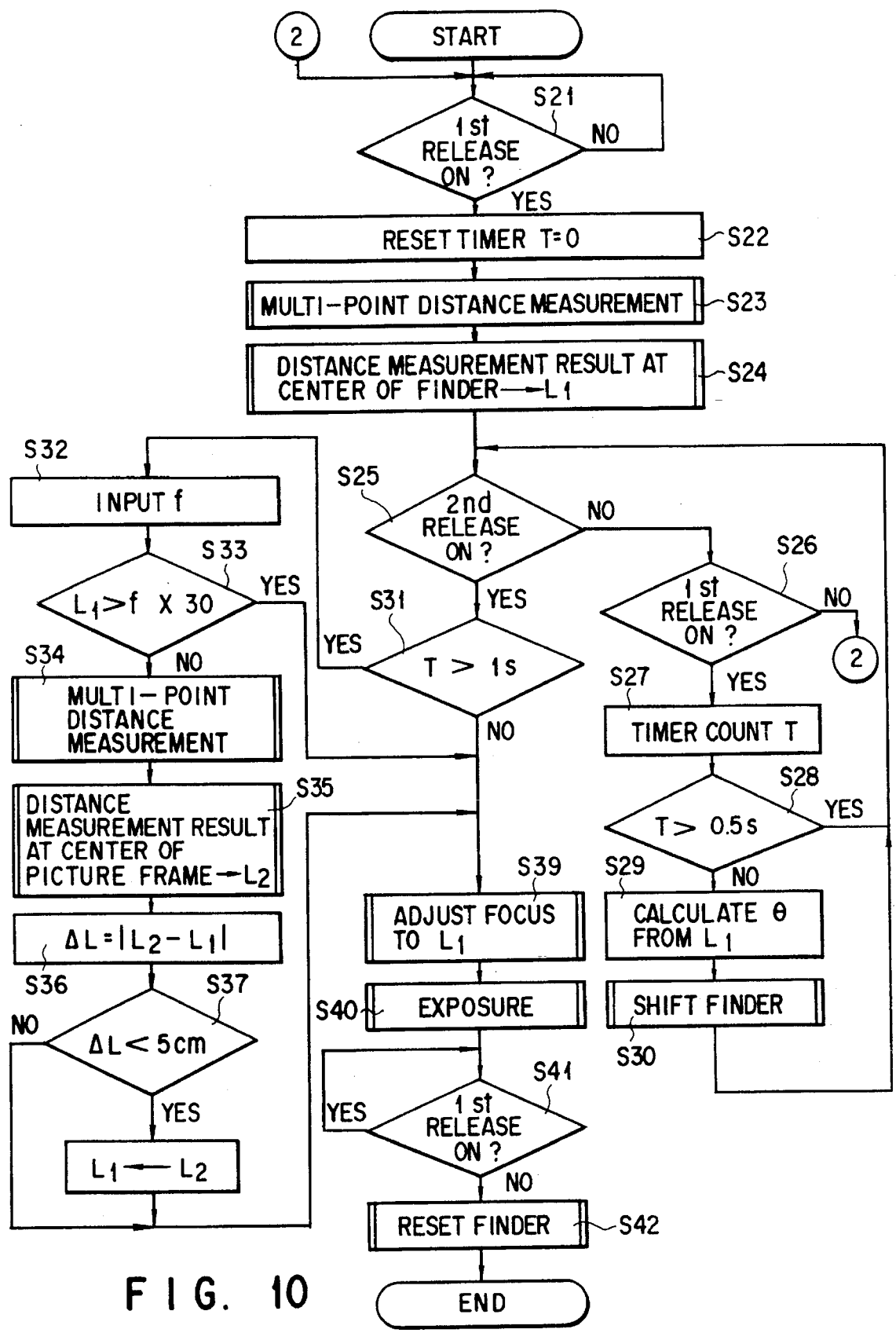
FIG. 10 is a flow chart for explaining the operation of the second embodiment.

Note that the flow chart in FIG. 10 does not include any processing operation corresponding to step S11 in the flow chart in FIG. 3, and the next distance measuring point is not particularly determined. This is because the second embodiment gives top priority to the distance measuring point at the center of the picture frame, i.e., multi-point distance measurement for multi AF is performed in distance re-measurement after the second release switch 12 is turned on upon depression of the release button 57.

In the processing after it is determined in step S25 that the second release switch 12 is ON, if the optical axis of the finder device 2 is to be switched, the flow branches from step S31 to step S32 to detect the focal length f of the photographing lens.

The distance measurement result $L_1$ at the center of the frame obtained in step S24 is discriminated in accordance with the focal length f. More specifically, if it is determined in step S33 that $L_1$ is larger than 30×f, the CPU 10 determines that the distance to an object is a far distance, and also determines that the distance error upon re-setting of the camera position after the optical axis of the finder device 2 is switched falls within the field depth and is negligible. Therefore, the flow branches to step S39.

On the other hand, if the CPU 10 determines in step S33 that the distance to the object is a near distance, the flow advances to step S34 to execute multi-point distance measurement for multi AF again. Subsequently, in step S35, the distance measurement result at the center of the frame is detected using equation (5), as shown in FIGS. 9A to 9C, and is determined to be $L_2$.

In step S36, the distance measurement result $L_1$ at the center of the finder is compared with the distance re-measurement result $L_2$ at the center of the frame to calculate a difference $\Delta L$ therebetween. In step S37, it is checked if the difference $\Delta L$ is smaller than 5 cm. If YES in step S37, it is determined that the camera position is re-set, as expected, and the flow advances to step S38 to give the top priority to the distance re-measurement result $L_2$. On the other hand, if NO in step S37, it is determined that the photographer has not re-set the camera position, and top priority is given to the initial distance measurement result $L_1$.

This operation is in accordance with the following concept. That is, even when the first release switch is turned on in a state shown in FIG. 12B, and the optical axis of the finder device is switched to a state shown in FIG. 12C, an object to which the photographer wants to adjust the focus is a flower present at the center of the frame in the state shown in FIG. 12B.

Even when the optical axis of the finder device is switched, if the photographer does not re-set the camera position, a picture shown in FIG. 12C can be taken. However, if top priority is given to the distance re-measurement result at this time, the focus is adjusted to a background image, and a picture which has a different composition and is out of focus is taken. Therefore, in step S37, such a phenomenon is prevented.

Since steps S21 to S23, S25 to S30, S31, and S39 to S42 are the same as steps S1 to S3, S5 to S10, S12, and S16 to S19 in the flow chart in FIG. 3 described above, a detailed description thereof will be omitted.

As described above, according to the second embodiment, even when the optical axis of the finder device is switched, focus adjustment is always performed on the basis of the distance measurement result at the central portion of the finder frame, and the photographer can take an in-focus picture by only framing a principal object at the center of the finder frame.

As described above, according to the present invention, a camera having a multi-point distance measuring device which can improve operability and can perform parallax correction without requiring a complicated arrangement can be provided.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A camera having a photographing lens and a finder for observing an object image using an optical system different from said photographing lens, the camera comprising:

multi-point distance measuring means for measuring distances to objects corresponding to a plurality of positions on a photographing frame;

determination means for determining a distance to a principal object on the basis of a plurality of distance measurement results from said multi-point distance measuring means;

a shift mechanism for shifting an observation frame of said finder;

shift control means for driving said shift mechanism so as to eliminate a parallax of said finder in accordance with the distance to the principal object determined by said determination means; and distance re-measuring means for performing distance re-measurement by changing the distance measuring position of the principal object by an amount shifted by said shift mechanism.

2. A camera according to claim 1, further comprising:

a first operation member for generating a first signal in response to a first operation by a photographer; and a second operation member for generating a second signal for starting an exposure operation in response to a second operation by the photographer, wherein after said multi-point distance measuring means performs a distance measuring operation in response to the first signal generated by said first operation member, the distance to the principal object is determined by said determination means, and the observation frame of said finder is shifted by said shift control means, and after said distance re-measuring means performs the distance re-measuring operation in response to the second signal generated by said second operation member, focus adjustment of said photographing lens is performed on the basis of the distance re-measurement result.

3. A camera according to claim 2, further comprising:

timer means for starting a time measuring operation in response to input of the first signal generated by said first operation member, wherein when the time measured by said timer means does not reach a predetermined time after the second signal generated by said second operation member is input, the focus adjustment of said photographing lens is performed on the basis of the distance to the principal object without executing distance re-measurement by said distance re-measuring means.

4. A camera according to claim 1, wherein when the distance to the principal object determined by said determination means is equal to or smaller than a predetermined distance, a focus adjustment operation of said photographing lens is performed on the basis of the distance to the principal object without executing distance re-measurement by said distance re-measuring means.

5. A camera according to claim 1, wherein if the distance to the principal object determined by said determination means is represented by $L_1$ and a distance between said finder and said photographing lens is represented by FL, said shift control means calculates an angle $\theta$ to be shifted by said shift mechanism using the following equation:

$$\theta = \arctan(FL/L_1)$$

and controls said shift mechanism on the basis of the angle $\theta$.

6. A camera according to claim 5, wherein said distance re-measuring means includes a light projection triangulation type distance measuring device, and if a projection angle of distance measuring light is represented by $\phi$, a shift in position of a light-emitting element is represented by $\Delta x$, and a focal length of a projection lens is represented by $f_T$, said distance re-measuring means calculates the angle $\phi$ using the following equation:

$$\phi = \arctan(\Delta x/f_T)$$

so that the angle $\phi$ is equal to the angle $\theta$ to be shifted by said shift mechanism.

7. A camera having a photographing lens and a finder for observing an object image using an optical system different from said photographing lens, the camera comprising:

distance measuring means for measuring a distance to an object;

a shift mechanism for shifting an observation frame of said finder;

shift control means for driving said shift mechanism to eliminate a parallax of said finder in accordance with a distance measurement result from said distance measuring means; and said distance measuring means performs distance re-measurement by changing a distance measuring position by an amount shifted by said shift mechanism.

8. A camera according to claim 7, wherein said distance measuring means includes multi-point distance measuring means for measuring distances to a plurality of objects, and for selecting a distance measuring position in consideration of a shift amount by said shift means.

9. A camera having a photographing lens and a finder far observing an object image using an optical system different from said photographing lens, the camera comprising:

distance measuring means for measuring a distance to an object corresponding to a central portion of a photographing frame;

a shift mechanism for shifting an observation frame of said finder;

shift control means for driving said shift mechanism to eliminate a parallax of said finder in accordance with a distance measurement result from said distance measuring means; and distance re-measuring means for measuring distances to objects corresponding to a plurality of positions on the photographing frame, and for re-measuring a distance to a position corresponding to the central portion of the photographing frame in accordance with a shift amount shifted by said shift mechanism.

10. A camera according to claim 9, wherein said distance measuring means and said distance re-measuring means commonly use an identical distance measuring device, and which is scanned along a line segment connecting an optical axis of said photographing lens and an optical axis of said finder.

11. A camera according to claim 9, further comprising:

a first operation member for generating a first signal in response to a first operation by a photographer; and a second operation member for generating a second signal for starting an exposure operation in response to a second operation by the photographer, wherein after said multi-point distance measuring means performs a distance measuring operation in response to the first signal generated by said first operation member, the observation frame of said finder is shifted by said shift control means on the basis of the distance measurement result, and after said distance re-measuring means performs the distance re-measuring operation in response to the second signal generated by said second operation member, focus adjustment of said photographing lens is performed on the basis of the distance re-measurement result.

12. A camera according to claim 11, further comprising:

timer means for starting a time measuring operation in response to input of the first signal generated by said first operation member, wherein when the time measured by said timer means does not reach a predetermined time after the second signal generated by said second operation member is input, the focus adjustment of said photographing lens is performed on the basis of the distance measurement result of said distance measuring means without executing distance re-measurement by said distance remeasuring means.

13. A camera according to claim 9, wherein when the distance to the principal object determined by said determination means is equal to or smaller than a predetermined distance, a focus adjustment operation of said photographing lens is performed on the basis of the distance measurement result of said distance measuring means without executing distance re-measurement by said distance re-measuring means.

14. A camera having a photographing lens and a finder for observing an object image using an optical system different from said photographing lens, the camera comprising:

multi-point distance measuring means for performing distance measurement at a plurality of positions;

distance measuring position switching means for switching a distance measuring position of said multi-point distance measuring means;

finder field changing means for changing an observation direction of said finder on the basis of a distance measurement result from said multi-point distance measuring means; and distance re-measuring means for performing distance re-measurement by switching a distance measuring position in accordance with a change amount of the observation direction of said finder by said distance measuring position switching means after said finder field changing means changes the observation direction of said finder.

15. A camera according to claim 14, further comprising:

a first operation member for generating a first signal in response to a first operation by a photographer; and a second operation member for generating a second signal for starting an exposure operation in response to a second operation by the photographer, wherein after said multi-point distance measuring means performs a distance measuring operation in response to the first signal generated by said first operation member, said finder field changing means changes the observation direction of said finder on the basis of the distance measurement result, and after said distance re-measuring means performs the distance re-measuring operation in response to the second signal generated by said second operation member, focus adjustment of said photographing lens is performed on the basis of the distance re-measurement result.

16. A camera according to claim 15, further comprising:

timer means for starting a time measuring operation in response to input of the first signal generated by said first operation member, wherein when the time measured by said timer means does not reach a predetermined time after the second signal generated by said second operation member is input, the focus adjustment of said photographing lens is performed on the basis of the distance measurement result of said distance measuring means without executing distance re-measurement by said distance re-measuring means.

17. A camera comprising:

a photographing lens;

a finder for observing an object image using an optical system different from said photographing lens;

distance measuring means for performing distance measurement at a plurality of points in response to an operation accomplished by an operation member; and switching means for selecting points which include points corresponding to the centers of said photographing lens and said finder, from the points at which the distance measurement is performed, and using the selected points for distance measurement, when a photographing frame of the photographing lens and an observation frame of the finder have centers which are different in focal point.

18. A camera comprising:

a first switch for detecting a timing prior to a photographing operation;

a second switch for detecting a timing of the photographing operation;

distance measuring means for performing distance measurement at a plurality of points in a photographing frame; and control means for controlling said distance measuring means in response to said first and second switches, said control means controlling the distance measurement by switching a distance measuring point in response to said first and second switches.

19. A camera according to claim 18, further comprising:

a photographing lens;

a finder for observing an object image using an optical system different from said photographing lens; and finder switching means for switching an observation direction of said finder in accordance with a distance measurement result after said distance measuring means performs distance measurement in response to said first switch.

20. A camera comprising:

a first switch for detecting a timing prior to a photographing operation;

a second switch for detecting a timing of the photographing operation;

distance measuring means for performing distance measurement at a plurality of points in a photographing frame; and control means for controlling said distance measuring means in response to said first and second switches, said control means setting the number of distance measuring points at which distance measurement is performed in response to said second switch to be smaller than the number of distance measuring points at which distance measurement is performed in response to said first switch.

21. A camera according to claim 20, further comprising:

a photographing lens;

a finder for observing an object image using an optical system different from said photographing lens; and finder switching means for switching an observation direction of said finder in accordance with a distance measurement result after said distance measuring means performs distance measurement in response to said first switch.

22. A camera comprising:

a first switch for detecting a timing prior to a photographing operation;

a second switch for detecting a timing of the photographing operation;

distance measuring means for performing distance measurement at a plurality of points in a photographing frame; and control means for controlling said distance measuring means in response to said first and second switches, said control means determining a distance measuring point in response to said second switch in accordance with a distance measurement result obtained in response to said first switch.

23. A camera according to claim 22, further comprising:

a photographing lens;

a finder for observing an object image using an optical system different from said photographing lens; and finder switching means for switching an observation direction of said finder in accordance with a distance measurement result after said distance measuring means performs distance measurement in response to said first switch.

\* \* \* \* \*